United States Patent [19]
Runkel

[11] Patent Number: 5,104,016
[45] Date of Patent: Apr. 14, 1992

[54] PRESSURIZED POTABLE BEVERAGE DRINKING SYSTEM

[75] Inventor: Kevin D. Runkel, Midkiff, Tex.

[73] Assignee: Bikestream, Inc., Midland, Tex.

[21] Appl. No.: 612,593

[22] Filed: Nov. 13, 1990

Related U.S. Application Data

[63] Continuation of Ser. No. 478,919, Feb. 12, 1990.

[51] Int. Cl.⁵ .............................................. B65D 37/00
[52] U.S. Cl. ................................... 224/148; 224/224; 222/105; 222/175
[58] Field of Search ............... 224/148, 151, 224, 253; 222/105, 175

[56] References Cited

U.S. PATENT DOCUMENTS

| | | | |
|---|---|---|---|
| 1,880,948 | 10/1932 | Evennett | 251/342 X |
| 3,356,265 | 12/1967 | Wiggins | 222/105 X |
| 3,981,415 | 9/1976 | Fowler et al. | 222/105 X |
| 4,090,650 | 5/1978 | Gotta | 224/148 |
| 4,106,675 | 8/1978 | Taylor | 251/342 X |
| 4,139,130 | 2/1979 | Glusker et al. | 224/148 |
| 4,176,772 | 12/1979 | Danon | 224/148 |
| 4,544,087 | 10/1985 | Modig | 224/148 |
| 4,629,098 | 12/1986 | Eger | 222/175 |
| 4,852,781 | 8/1989 | Shurnick et al. | 224/148 |
| 4,948,023 | 8/1990 | Tripp | 224/148 |

FOREIGN PATENT DOCUMENTS 2626558  8/1989  France .................................. 222/175

Primary Examiner—Henry J. Recla
Assistant Examiner—Robert M. Fetsuga
Attorney, Agent, or Firm—Geoffrey A. Mantooth; James C. Fails

[57] ABSTRACT

What is disclosed is a drinking system for a rider of a bicycle characterized by inflatable bladder with suitable conduit and valves for conveying the potable beverage stored in the inflatable bladder to the drinker on the bicycle so the bicycle rider can drink a potable beverage without having to stop the bicycle. Also disclosed are specific preferred embodiments.

5 Claims, 4 Drawing Sheets

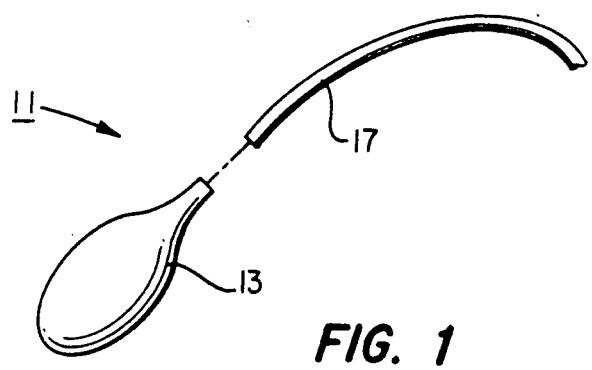
FIG. 1
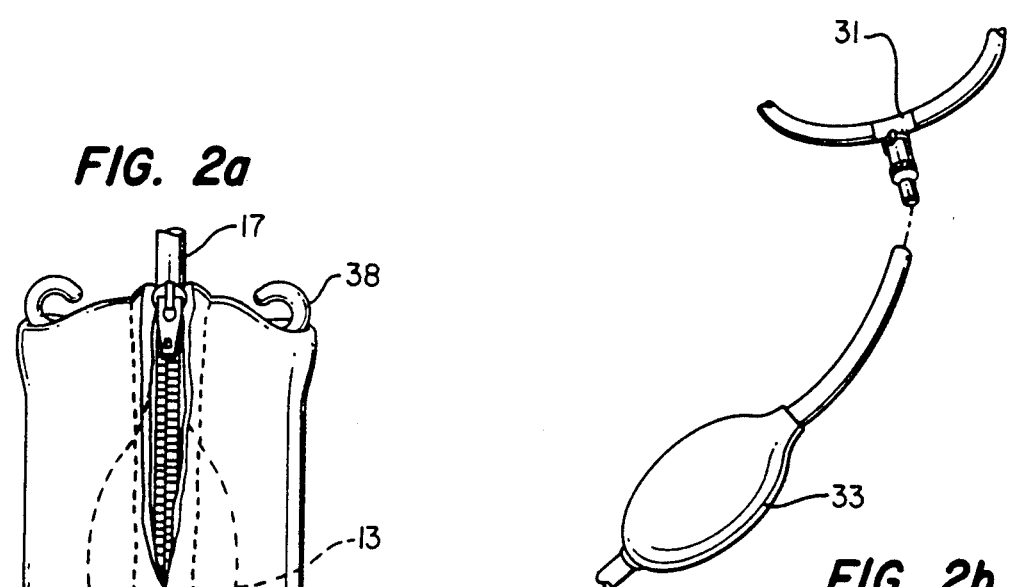
FIG. 2a
FIG. 2b
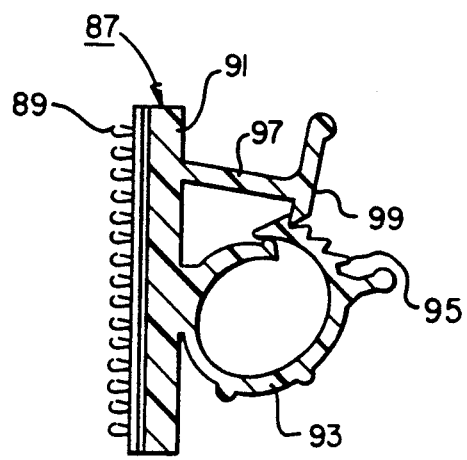
FIG. 10

PRESSURIZED POTABLE BEVERAGE DRINKING SYSTEM

This application is a continuation of application Ser. No. 478,919, filed Feb. 12, 1990.

FIELD OF THE INVENTION

This invention relates to apparatus for taking in a liquid. In particular, this invention relates to drinking apparatus. More particularly, it relates to a drinking apparatus whereby an athlete such as a jogger or bicycle rider can ingest a liquid such as water without interrupting whatever the athlete is doing.

BACKGROUND OF THE INVENTION

In jogging, racing and other athletic situations there occurs problems when the athlete does not wish to stop to drink. For a cyclist, it is known to employ removable drinking bottles or the like that are may be clipped to the center portion of the bicycle. This is not a totally satisfactory solution, since the bicycle rider has to cope with gripping the removable container and bring it upwardly to drink from the container. This requires the use of the hands Moreover, there is a risk that the bicycle rider/drinker will have an accident, or otherwise drop the container and still have to stop the bicycle. Runners, similarly, may wish or need to drink without stopping or using their hands to handle containers of water or the like, as in marathons.

The closest prior art of which the inventor is aware is U.S. Pat. No. 4,095,812. This patent describes a retractable bicycle apparatus in which a hose or tube is wound upon a spring loaded reel so that the hose can be pulled from the reel to drink; but it tightens a spring in so doing, so the hose will retract when the tube is released thereafter. The beverage supplied to the rider in that patent is sucked through the hose. The system employed a retractable hose and the beverage is not pressurized to the rider. Consequently there are disadvantages attendant to the patented system.

It is desirable that systems of this invention have one or more of the following features not heretofore provided.

1. The invention should provide a tube for conducting water or the potable beverage to the mouth of the athlete for drinking.
2. This invention should provide a method of controlling the flow of water through the tube provided to the mouth of the athlete.
3. This invention should provide a method of storing water that enables drinking without stopping or undue use of the hands.

As will be seen, the prior art has not provided us without some attendant disadvantages and some other prior art will be seen hereinafter.

Other systems turned up by a pre-examination search on the bicycle apparatus include the following (no search having been conducted on the runner version per se).

U.S. Pat. No. 627,693, Howarth, is not a beverage dispenser but is a system for holding material such as pepper to ward off attacking dogs. It employs a hand pump and when compressed, forces pepper into a dog's face.

U.S. Pat. No. 3,160,330, Pollitt, employs a captive air charge to force beverage from a fixed volume liquid container. The liquid is then siphoned out. The system of the present invention employs no fixed volume and uses no air or siphon to drive the liquid from the container.

U.S. Pat. No. 4,150,681, Howarth, Jr. describes a device that uses a captive air charge to drive a cleaning solution to clean mud or dirt from the riders goggles.

U.S. Pat. No. 4,274,566, Rowe, describes a device that is an improved version of the previous reel type device described in U.S. Pat. No. 4,095,812. This device retracts a hose in linear manner instead of radial manner and requires the beverage be sucked from the container.

U.S. Pat. No. 4,807,813, Coleman, describes a device that uses a pump that is powered by contact with the wheel or the like of the bicycle. This is a device for entertainment and differs greatly from the invention described and claimed in this application.

From the foregoing it can be seen that it is desirable that a drinking apparatus for an athlete, such as a jogger or rider of a bicycle be enabled to have a drink of a potable beverage, such as water, without having to stop and without requiring the use of the hands, and without the attendant risk of dropping a container of the beverage.

SUMMARY OF THE INVENTION

Accordingly, it is an object of this invention to provide one or more of the foregoing features delineated as desirable and not heretofore provided with the prior art.

Specifically, it is an object of this invention to provide a drinking apparatus that provides all of the features delineated hereinbefore as desirable not heretofore provided by the prior art.

These and other objects will become apparent from descriptive matter hereinafter, particularly when taken in conjunction with the appended drawings.

In accordance with one embodiment of this invention there is provided drinking apparatus for the rider of a bicycle characterized by an inflatable bladder means adapted to receive a potable beverage under pressure and to expand in proportion to the volume of the fluid so as to provide an expelling force for the potable beverage and force the potable beverage to a drinker riding the bicycle when a flow path is established; a drinking tube for drinking therefrom by the rider; the drinking tube extending from the frame of the bicycle toward the drinker and having a free drinking end; a conduit means connected from the inflatable bladder means to the drinking tube adapted for conveying the potable beverage to the drinking tube; a valve means interposed between the inflatable bladder means and the free drinking end of the drinking tube, the valve means being operable by the drinker to be open to afford a drink as needed by the drinker; and tie means for tying the conduit means to the frame of the bicycle for supporting and conveying the potable beverage to the drinker.

In another embodiment, this invention comprises drinking apparatus for a runner or the like characterized by an inflatable bladder means adapted to receive a potable beverage under pressure and to expand in proportion to the volume of fluid so as to provide an expelling force for the potable beverage and force the potable beverage to a runner when a flow path is established; a drinking tube for drinking therefrom by the runner, the drinking tube extending from the waist of the runner and having a free drinking end; conduit means connected from the inflatable bladder to the drinking tube and adapted for conveying the potable beverage to the drinking tube; a valve means interposed intermediate the inflatable bladder means and the free drinking end of the drinking tube, the valve means being operable by the drinker to be opened to afford a drink as needed by the drinker; and valve means and tee means for filling the inflatable bladder with the potable beverage.

BRIEF DESCRIPTION OF THE DRAWINGS

FIG. 1 is an isometric view showing the insertion of a tube in the bladder.

FIG. 2a is an isometric view showing the bladder and tubing inserted into a container which can be tied to the seat of the bicycle.

FIG. 2b is an illustration of a tee being inserted into a line to facilitate filling of the bladder of FIG. 1.

FIG. 10 is a cross sectional view of a bracket 87 in accordance with one embodiment of this invention.

DESCRIPTION OF PREFERRED EMBODIMENTS

Figure 3:
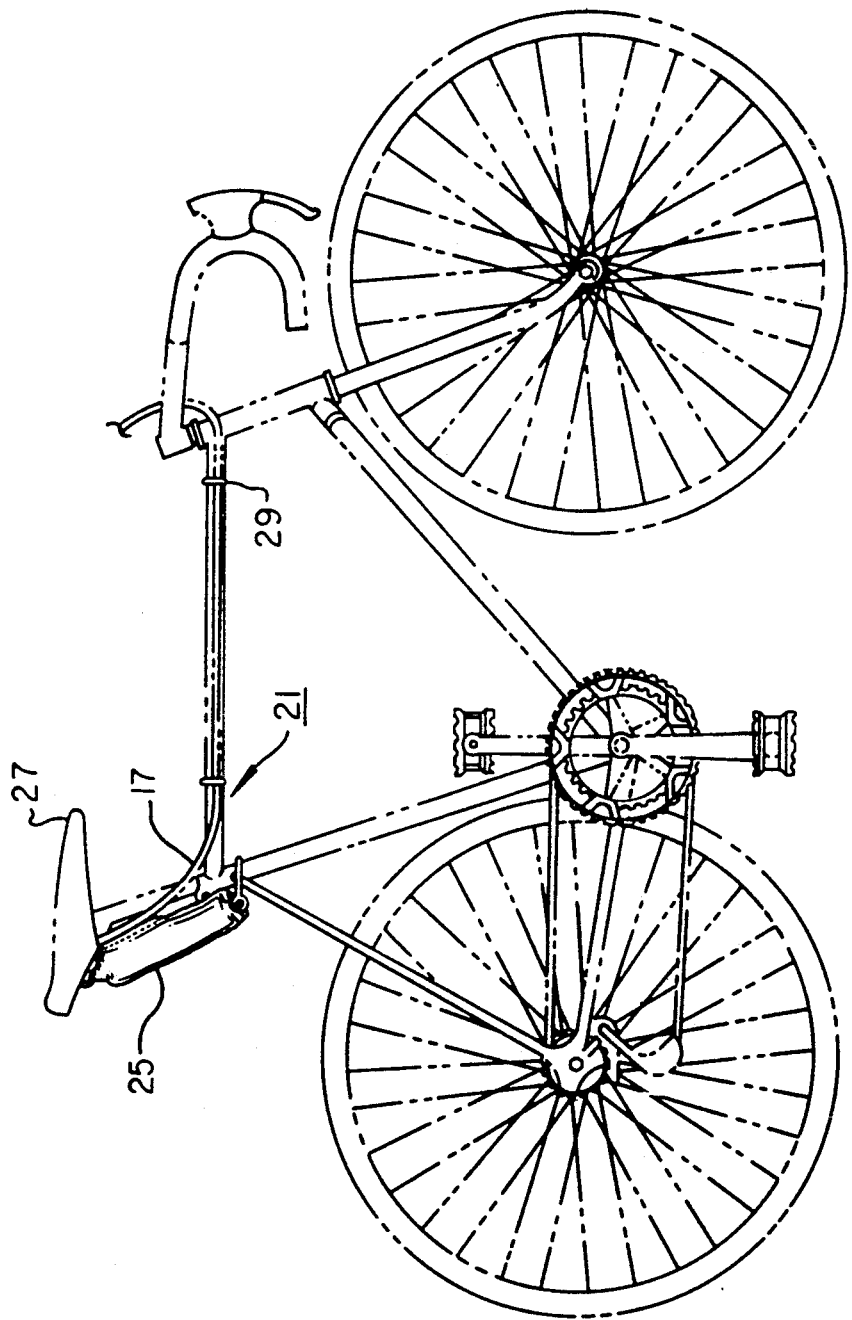
FIG. 3 is a partial isometric view showing the holder for the bladder being tied in place beneath the seat of a bicycle.
Figure 4:
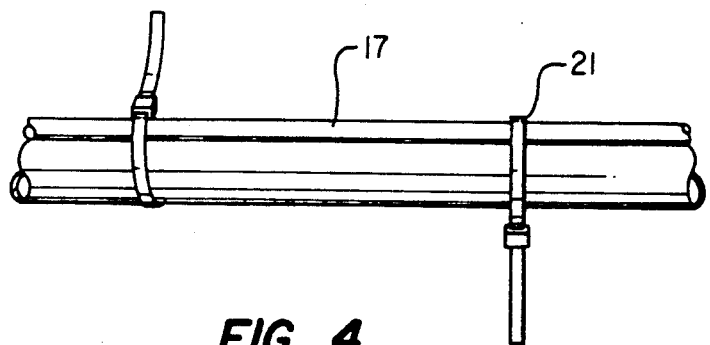
FIG. 4 is a partial isometric view showing one way of fastening a hose to the frame of a bicycle in accordance with preferred embodiment of this invention.

It should be borne in mind that more than one embodiment of this invention can be employed and the descriptive matter and figures shown herein are useful in more than one application. It has been found, however, that the invention can be readily employed to allow in one embodiment a drinker to drink without using hands, running the risk of an accident, or in any event, dropping a container of water or the like and otherwise afford the delineated desirable features of this invention.

Referring to FIGS. 1, 2a, 2b, and 3-7, the drinking apparatus 11, is designed primarily for a bicycle and its rider/drinker. The drinking apparatus 11 comprises an inflatable bladder means 13, FIGS. 1 and 2a; a drinking tube 15, FIGS. 5 and 6; a conduit means 17, FIGS. 1-5; a valve means 19, FIGS. 6 and 7; and tie means 21, FIGS. 3-5.

The bladder 13 is inflatable and is adapted to receive a potable beverage such as water under pressure and to expand in proportion to the volume of fluid much like a balloon, so as to provide an expelling force to force the potable beverage to a drinker riding the bicycle when a flow path is established.

Referring to FIG. 1, the conduit means, such as a quarter inch plastic tubing, or hose, is inserted into the bladder 13. The insertion may be done by wetting the hose 17. The fitting between the hose and bladder should be tight enough to withstand the force of any hydraulic pressure applied to inflate the bladder and allow an expelling force to be applied to the water, or the potable beverage. (If it is not tight enough, a simple o-ring can be employed on the neck of the bladder 13.) A suitable clamp can be in the form of a plastic tie with a suitable tightener or may take the form of a conventional hose clamp with means for applying mechanical pressure although the later is ordinarily not necessary. The bladder 13 may be inserted within a suitable enlarged holder 25, FIG. 2a, to allow the bladder to be inflated by insertion under pressure of the potable beverage such as water.

The holder 25 is affixed in a suitable spot such as under the bicycle seat 27, FIG. 3, as by ties 29. As many ties 29 may be employed as desired. In the illustrated example, three ties are employed to hold in place the holder 25 and the bladder 13 therewithin. The ties 29 may take any suitable form such as plastic, cord or the like. Preferably, they are cord so that they can accommodate any structure of seat without having to be too long if formed of plastic.

Figure 6:
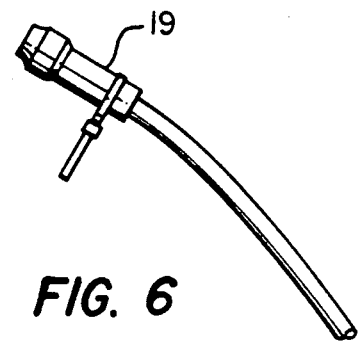
FIG. 6 illustrates one way of connecting a bite valve onto a drinking hose free end, or drinking end.
Figure 5:
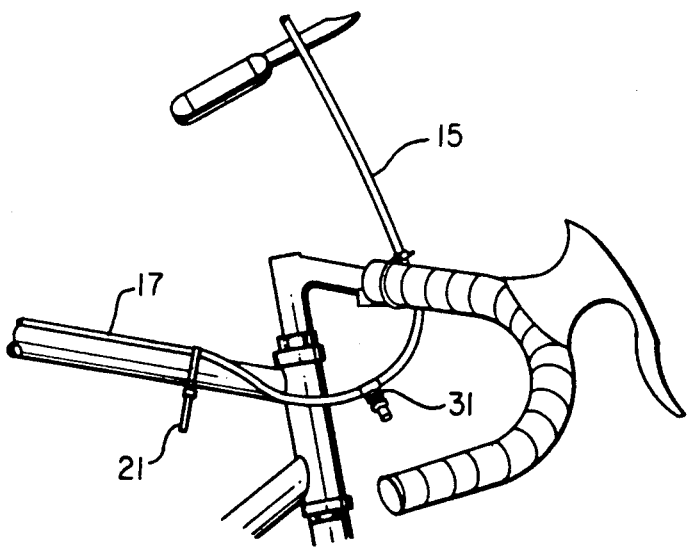
FIG. 5 is a partial isometric view showing a drinking hose being cut to the desired length as it extends upwardly to the handlebars of the bicycle to facilitate drinking by a rider.

The drinking tube 15, FIGS. 5 and 6, is cut to the desired length, as illustrated in FIG. 5, and is associated with a valve interposed in series with the flow of fluid therethrough. As illustrated in FIG. 6, the valve is on the drinking end of the drinking tube 15 and is illustrated as the valve means 19 which will be discussed later hereinafter.

The conduit means 17 extends between the inflatable bladder and the drinking end of the drinking tube with the means for pumping the potable beverage such as water, under pressure into the inflatable bladder to blow it up, analogous to a balloon. In the illustrated embodiments the drinking tube and the conduit means are plastic tubing such as ¼ inch polyethylene tubing.

As illustrated in FIG. 2b, a tee 31 is employed to connect with a pump such as bulb 33. The bulb 33 may be connected at one end with a source of the potable beverage, such as water, and pump it through the tee 31. The tee 31 contains a check valve therewithin such that the water supply can be forced into the inflatable bladder 13 through the conduit means and the check valve will prevent back flow. The bulb 33 can be employed to get the desired pressure. Ordinarily very little pressure is necessary to inflate the bladder, since it is not a strong elastic material that is significantly resistive to pressure inflating it. A check valve in the tee 31 simply prevents liquid from flowing outwardly to the bulb 33 but allows liquid to flow through the conduit means and the drinking tube 15 if not otherwise restricted.

The conduit means 17 is connected with a valve means 19 at some point. As illustrated, the valve means 19 is on the end of the drinking tube to establish a flow path for drinking. Otherwise, the conduit means 17 are tied along the structural, or frame, members of the bicycle as by tie means 21.

As illustrated in FIGS. 5 and 6, the valve means 19 is a bite valve 19 that enables the bicycle rider to simply bite the valve to establish a flow path and allow the potable beverage, such as water, under pressure to flow into the mouth of the drinker The tie means 21 may be any of the conventional tie means. As illustrated, they are simply plastic strips that can be pulled taut and then cut to the desired length. The plastic must not be so tight as to crush the ¼ inch plastic tubing which is flexible and extends along the frame of the bicycle.

Once the installation has been completed, the conduit means can be tested by inflating the bladder with a hand pump such as the bulb 33. Thereafter, the water under pressure is stored in the bladder. The system can be inspected to be sure that it is free from leaks. The plastic cords may hold the bladder and its holder underneath the seat while this is being done.

Referring to FIG. 3, the bladder and its holder are affixed beneath the seat with the holder being maintained substantially vertically mounted. There is a bungee type construction intermediate the plastic hooks, or fasteners, 38, FIG. 2a. These are affixed so that, as illustrated in FIG. 3, there is no danger of the holder hitting a tire on the bicycle or the like. Specifically, the holder 25 will be inflated as the bladder is inflated so that a vertically suspended container of potable beverage is carried by the rider/drinker.

Figure 7:
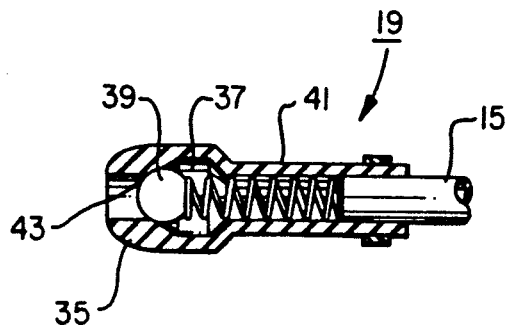
FIG. 7 is a cross-sectional view of the bite valve in accordance with one embodiment of this invention.

The bite valve 19 is illustrated in FIG. 7. Therein, the sidewalls 35 define a chamber 37 within which is seated a ball 39 held in place by a spring 41. As will be understood, the ball will be biased to close against a seat 43 and prevent there being a flow path in normal operation. When the drinker decides to drink he simply bites on the upper part of the valve 19 forcing the ball from the seat 43 and establishing a flow path for the water to flow around the ball 39. Water can flow until the drinker has enough, at which time he simply releases the bite valve and the spring 41 pushes the ball back into place and engagement with the seat 43 to seal off against the flow of the potable beverage, such as water.

In operation, the system is installed as indicated and the inflatable bladder is inflated with water under pressure. The water remains in the bladder under pressure until the drinker operates the valve main such as biting on the bite valve 19. At this time, a flow path is established and water flows under pressure outwardly from the bladder into the mouth of the drinker. This can be done without requiring stopping the bicycle or the use of the hands of the rider/drinker.

Figure 8:
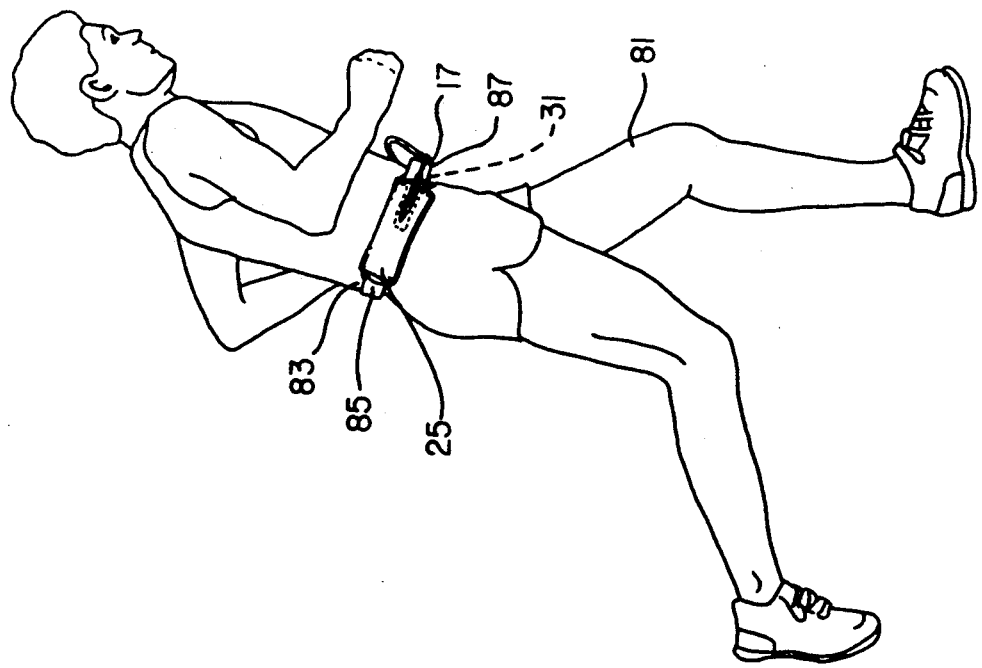
FIG. 8 is a somewhat schematic view of a runner with a belt means around his waist supporting a drinking apparatus thereon.

Referring to FIG. 8, a runner 81 wears about his waist 83 a belt 85. The belt 85 may be connected to the ends of an outer holder 25 (on the far side of the runner) and may be of an exterior consistency having hook type pile such that it can be affixed to a VELCRO (a trademark for a J type hook that can be affixed by simply pushing and released by pulling) tab. Affixed to the VELCRO tab will be a bracket 87.

Although it may not be clearly apparent, in FIG. 8, there is only a short conduit 17 before a tee with check valve 31 employed on the belt for storing the water in the expansible bladder 13 interiorly of the holder 25. A holder 25, similarly as illustrated in FIG. 2a is employed.

Figure 9:
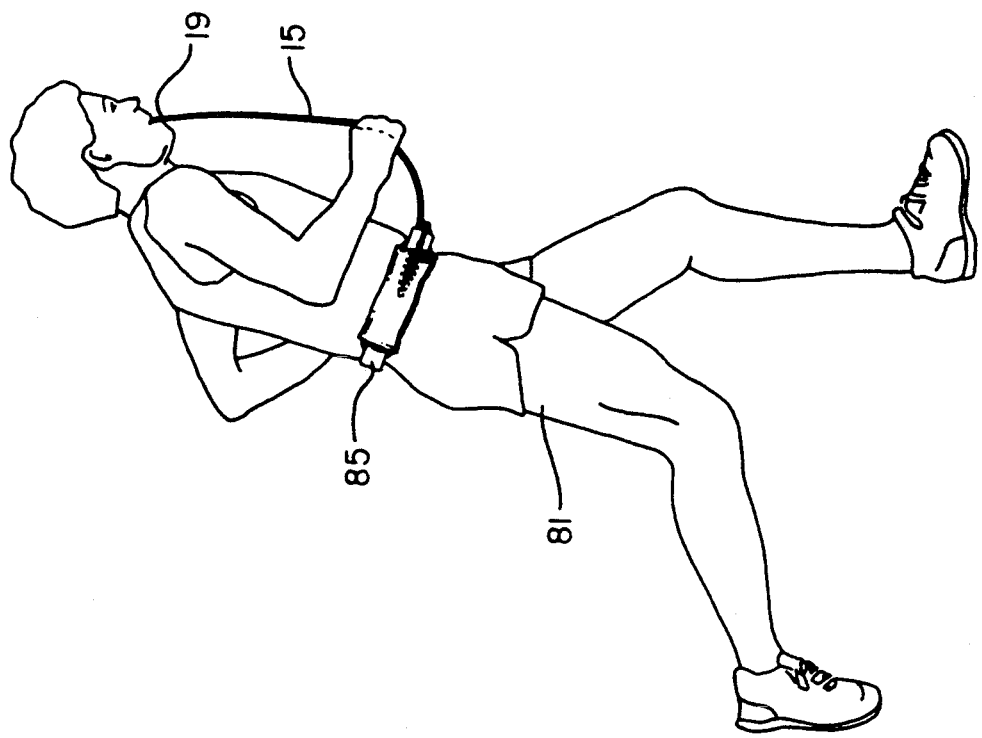
FIG. 9 is a somewhat schematic view of the runner of FIG. 8 with the drinking tube having been pulled from the belt and put to the mouth of the runner for drinking.

Referring to FIG. 9, the athlete 81, such as a runner, will have pulled loose and brought to his mouth the bite valve 19 and the drinking tube 15. Thus when he bites on the bite valve 19, a flow path will have been established from the bladder to the mouth of the runner 81.

The operation is substantially the same as described hereinbefore in that the inflatable bladder will have been inflated with water under pressure. The water remains in the bladder under pressure until the drinker operates the valve means such as biting on the bite valve 19. At the time the flow path is established, as by biting on the valve and opening the conduit to the mouth, water flows under pressure outwardly from the bladder into the mouth of the runner 81. This can be done without stopping and without requiring significant use of the hands.

If desired, the hand such as the right or left hand, can be employed in refastening the drinking tube 15 and the bite valve 19, as by way of bracket 87. The bracket 87 is illustrated in FIG. 10 in cross section. Specifically, the VELCRO fastener with its J hooks 89 can be pushed inwardly to hook onto the belt 85. A base 91 is affixed to the VELCRO, as by adhesive or the like and contains a C shaped retainer 93. The C-shaped receiver 93 can receive the drinking tube 15 when implaced therewithin. The exterior of the C-shaped receiver 93 has suitable teeth 95. An upper snap 97 has a mating tooth 99 that can engage the teeth 95 on the C-shaped receiver 93. Thus, if desired, the snap 97 can be left in place with its tooth 99 engaging the teeth 95 and hold the drinking tube and the J hooks 89 simply pull from engagement with the belt 85 to raise the entire bracket 87, drinking tube 15 and bite valve 19 to the mouth of the runner 81. On the other hand, the bracket can be made easily releasable if desired and the bracket left in place with the J hooks 89 engaging the belt 85.

In both embodiments, the bladder 13 can be drained by simply disconnecting the conduit 17. A separate drain valve can be employed if desired From the foregoing can be seen that this invention achieves the objects delineated hereinbefore.

Although the invention has been described with a certain degree of particularity, it is understood that the present disclosure is made only by way of example and numerous changes in the details of construction and the combination and arrangement of parts may be resorted to without departing from the spirit and the scope of the invention, reference being had for the latter purpose to the appended claims.

What is claimed is

1. A drinking apparatus for a human comprising:
   a. an inflatable bladder means adapted to receive a fluid under pressure and to expand in proportion to the volume of fluid located therein so as to provide an expelling force for said fluid;
   b. conduit means for conveying said pressurized fluid from said bladder means, said conduit means having first and second ends, said first end of said conduit means being connected with said bladder means, said second end of said conduit means being free;
   c. said conduit means having a valve means located at said second end, said valve means being operable by said human to be opened to afford a drink as needed by said human;
   d. holder means for containing said bladder means, said bladder means being located within said holder means and being expandable within said holder means;
   e. carrying means for carrying said bladder means, said carrying means comprising a belt that is adapted to be worn around the waist of said human, said belt being coupled to said holder means, whereby said human can drink said fluid without stopping.

2. The drinking apparatus of claim 1 wherein said valve means comprises a bite valve.

3. The drinking apparatus of claim 1 wherein said fluid is potable water.

4. The drinking apparatus of claim 1 further comprising coupling means for coupling said free end of said conduit means to said belt, said coupling means being located on said belt and on said free end.

5. The drinking apparatus of claim 4 wherein said coupling means comprises hook-and-loop fasteners.

* * * * *